United States Patent [19]

Mogard

[11] Patent Number: 4,822,559
[45] Date of Patent: Apr. 18, 1989

[54] NUCLEAR FUEL ELEMENT
[75] Inventor: Hilding Mogard, Lidingo, Sweden
[73] Assignee: Studsvik Energiteknik AB, Sweden
[21] Appl. No.: 95,095
[22] Filed: Sep. 10, 1987
[30] Foreign Application Priority Data Sep. 15, 1986 [SE] Sweden .............................. 8603873

[51] Int. Cl.⁴ .............................................. G21C 3/00
[52] U.S. Cl. .................................... 376/415; 376/453
[58] Field of Search ............................... 376/415, 453
[56] References Cited
U.S. PATENT DOCUMENTS 3,697,373 10/1972 Emon .................................. 376/415
4,004,972 1/1977 Mogard .............................. 376/415

Primary Examiner—Donald P. Walsh
Attorney, Agent, or Firm—Burns, Doane, Swecker & Mathis

[57] ABSTRACT

A nuclear fuel element for use in power-producing nuclear reactors, comprising a circular metal cladding tube containing sintered cylindrical oxide fuel pellets, the tube being formed internally with a substantially cylindrical inner surface having a plurality of longitudinal ribs forming axially extending channels. The fuel pellets have chamfered endfaces creating toroidal spaces at the adjoining ends of the fuel pellets, the ratio of axial channel to toroidal space volumes including any pellet dishing being at most about one (1);

a process for the manufacture of such fuel element.

19 Claims, 2 Drawing Sheets

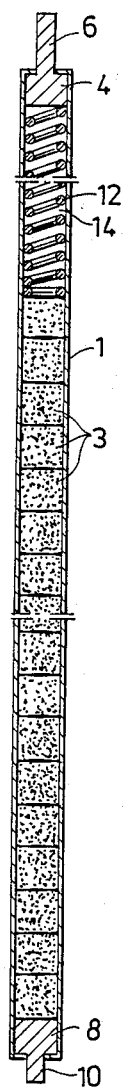
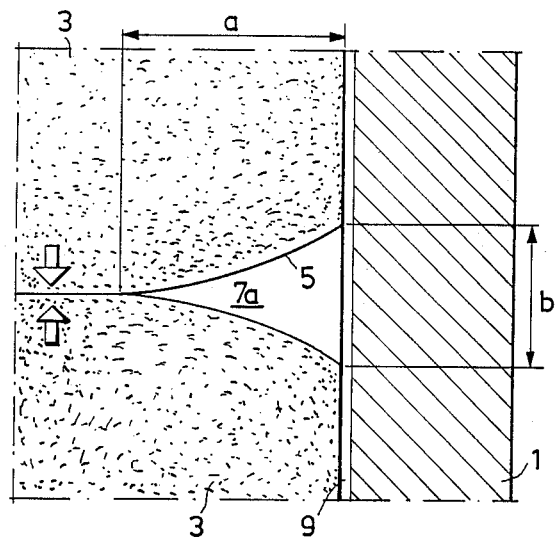
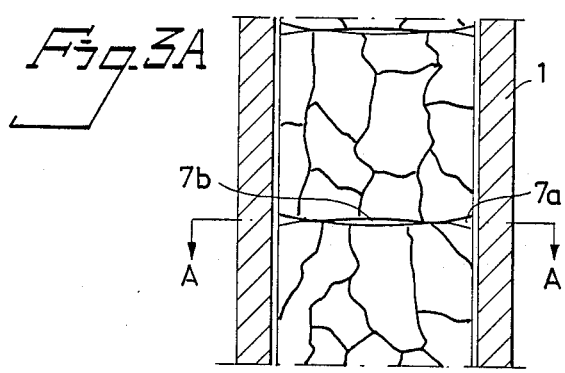
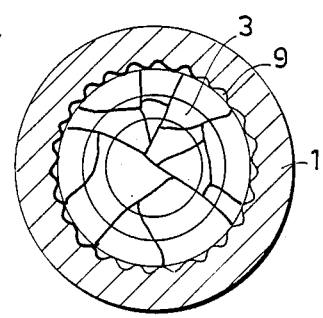

NUCLEAR FUEL ELEMENT

FIELD OF THE INVENTION

The present invention relates to a nuclear fuel element for use in power-producing nuclear reactors, and the invention also includes a process for the manufacture of such nuclear fuel element.

BACKGROUND OF RELATED ART

The present invention of a nuclear power fuel element provides for significant performance improvements of light waterreactor (LWR) fuel under heavy duty operating conditions e.g. under load follow, off-normal power transients, and extended fuel burnup operation, where phenomena like fission gas release and stress corrosion cracking of the fuel cladding may be life limiting. The invention resides in a significant improvement of the basic fuel design concept for use in current type nuclear fuel elements (fuel rods) in water cooled power reactors as described in British Pat. No. 1 454 618.

The characteristic design feature of said prior art is the fuel clad tubing (made out of zirconium metal or zirconium alloy), which is provided on its inside bore surface with a multitude of radially protruding, axially extending ribs of minute radial dimensions ($<1\%$ of the tube radius). Said ribbed bore configuration is claimed to offer two phenomenologically different, but concurrent, fuel performance improvements:
1. It minimizes the propensity for fuel failure through pellet/clad interaction (PCI) induced stress corrosion cracking (SCC) on fuel power ramping during reactor operation by reducing the magnitude of stress concentrations imposed by widening crack openings in the underlying fuel pellets.
2. It prevents the formation of local axial gaps in the fuel column under power operation due to in-reactor pellet densification (a safety concern) by locking the individual pellets in their axial positions at their slightly outbending and indenting corners (see FIGS. 6 and 7 of said British patent).

The densification problem of the early seventies is, however, no longer of any licencing concern to the nuclear fuel industry. Already by the mid seventies that problem was resolved by other means, such as by proper control of the pellet sintering process.

However, the PCI/SCC failure problem still waits for further progress to find a reliable, nonexpensive solution that also meets more recent requirements on fuel performance, e.g., imposed by fuel exposure to higher fuel burnup. So far, the reactor operators prefer to cope with the PCI/SCC performance problem by simply following cautious operating guide rules. This approach, however, may be costly because it restricts flexible power operation. Moreover, it is not reliable as a protection against PCI/SCC failure.

Currently the pure zirconium "liner" concept attracts commercial interest as a PCI/SCC remedy. It permits flexible power operation but is expensive in manufacturing and the zirconium liner may corrode excessively when exposed to high temperature water in failed fuel. Furthermore, that PCI/SCC remedy does not address the fission gas release (FGR) problem at medium or high burnup. On the contrary its use may even promote an excessive FGR, i.e., it offers the advantage of being insensitive to PCI/SCC failure on operation at attractive high power in the temperature range where, however, FGR takes place.

In heavy water reactors a graphite coating of the clad bore surface operates satisfactorily as a PCI/SCC remedy up to approximately 10 MWD/kg U. At the high exposures typical of LWRs the graphite coating, however, shows a very unreliable performance. Otherwise, the graphite coating technique is quite attractive as being quite simple and inexpensive.

The clad rib design of this prior art has been shown to raise the PCI/SCC failure resistance significantly and this is due to certain combinations of bore design parameters.

The present invention is based on the results and analyses of continued irradiation programs testing various modifications of the original internal clad rib design as disclosed in British Pat. No. 1 454 618. The aim has been to explore this fuel concept still further, as it has been realized that it has unique potential for solving also other types of fuel performance problems of more recent concern, in particular relating to fission gas release. As a result a still more effective, low-cost and technically simple design solution to the afore-mentioned PCI/SCC failure problem has emerged. Concurrently the same modified design offers solutions, unique to the rib cladding, to a number of additional, potentially life limiting performance problems, currently of special interest in the attempts to reach higher fuel burnup levels. Basically, all these performance problems being addressed emanate from one single crucial phenomenon, i.e., the excessive release of fission product gases and other volatile elements from the fuel pellets, operating at high temperature ($>1000°$ C.), like xenon, krypton, iodine, cadmium, etc.

The fission gases (FG), that give rise to a variety of fuel performance problems, are known to be released significantly first above a certain fuel temperature level. This level decreases some hundred centigrades with increasing fuel burnup and may be exceeded during operation and thus more readily at higher burnup, e.g. on a power ramp. Iodine and cadmium are considered to be the active corrodents in the PCI/SCC failure mechanism. Xenon and krypton are heavy noble gases of very low thermal conductivity which on release contaminate the high conductivity helium filler gas in the fuel rod. As a result the thermal conduction within the fuel rod will be impaired, which causes the temperature to rise within the fuel pellets. If this temperature rise exceeds the critical temperature of FGR an additional amount of the contained FG in the pellet structure will be released. This causes an additional temperature rise and still more FGR etc., i.e. a "temperature feed back mechanism" comes into operation. The rise to high temperatures and the quantity of released fission gases become potentially life limiting. The higher fuel temperature, (resulting in higher stored fuel energy), and the release of large quantities of fission gases may present safety problems, e.g., in loss of coolant accidents (LOCA) and give rise to an impermissible, high internal gas pressure before "end-of-life".

The thermal feed back effect becomes occasionally operative already at medium burnup levels, particularly in BWR fuel rods, say at about 15–20 MWd/kg U, causing some fuel rods to show high FGR values, typically in excess of about 10% of the accumulated inventory. Only a limited number of such high FGR rods in the reactor core are generally tolerable form a LOCA point of view. The reasons for the onset of excessive FGR may be several: an inadvertent power transient, the presence of thermally unstable fuel pellets or the incorporation of too large initial pellet/clad gaps, etc. When once initiated the process tends to propagate spontaneously from pellet to pellet along the whole fuel column along with the successive degradation of the thermal conductivity by the migrating fission gases.

An important contributing factor to the thermal feed back effect is a very slow restoration of the gas conductivity at the position of FGR within the fuel rod. In particular, under conditions of fuel operation, when the helium fill gas in the top chamber (plenum) of the fuel column (see FIG. 1 of said British patent) has to migrate relatively long distances axially down the rod through narrow and tortuous paths within the cracked pellet column, the problem becomes accentuated. At high burnup levels, say beyond 30 to 40 MWd/kg U, where the pellet/clad gap is essentially closed the problem of slow axial gas mixing becomes a real concern. In fact, it has been experimentally observed that under closed gap conditions the axial gas migration is almost non-existent. It may take days or even weeks for the helium gas to migrate down to the lower part of the fuel rod and there successively restore the gas conductivity. The risk for initiation of a thermal feed back effect is obvious. The prospects for extending the fuel operation to higher burnup levels may thus be effectively restricted by the slow axial gas mixing process, should a critical amount of fission gases happen to be released during operation.

Another important experimental observation in this context is that in spite of the fact that the fuel rod of the conventional design operates with the pellet/clad gaps effectively closed and the pellet/clad contact pressure remains high, and consequently the interfacial heat transfer should be very good, the pellet average temperature rises significantly when fission gases are being introduced. The interpretation of this behaviour is, that the initial hot gap volume by the time has moved inwards into the pellet body (whose fragments have relocated outwardly) and there re-appears as a multitude of crack voids. This dispersed crack volume may amount to some 10% of the initial cold assembly gap space. When penetrated by fission gases, the narrow pellet cracks will act as thermal barriers and effectively impair the heat conduction through the pellet fragments.

In order to depress such inadvertent release of fission gases during power manoeuvering by means of fuel design and make it feasible to extend the fuel burnup target significantly, smaller diameter rods are currently becoming commercially introduced into the fuel assemblies, e.g., 9×9 rod assemblies instead of current 8×8 rod assemblies in BWRs. In doing so, the fuel operating temperature decreases as also the linear heat rating of the fuel rods. Consequently the margin against inadvertent release of fission gases becomes larger. Furthermore, the margin against PCI/SCC failure also improves. However, such rods, which are more expensive in fabrication, may suffer from another feature of heat conduction now appearing as a shorter fuel thermal time constant, i.e., such slimmer rods transfer the generated fissile power with a faster rate to the water coolant than larger diameter rods. This behaviour may effect the BWR core stability under certain modes of operation and present a safety issue. In this case the heat transfer is actually too efficient through the pellet/clad gap.

SUMMARY OF THE INVENTION

The present invention presents a fuel design solution common to all the briefly described performance problems in current type LWR fuel elements said problems being:
1. The degradation of the pellet/gap thermal conductivity following FGR.
2. The thermal feed back effect.
3. The slow axial gas migration.
4. The PCI/SCC failure propensity.
5. The shorter fuel thermal "constant" of small diameter rods.

The invention is based on the understanding that the five listed items are interrelated phenomenologically. In this respect the invention differs from that of the previously quoted British patent which dealt with two unrelated phenomena in fuel performance. The common basis characteristic to the invention is the fission gas appearance (release, concentration, distribution, etc.) within the fuel rod and its influence on the fuel behaviour in critical operating situations.

The main object of the invention is to effectively minimize the detrimental effects of FGR. The approach adopted to attain this object is briefly the following:

According to the invention provisions are made in designing the clad bore configuration and the pellet shape in such a manner, that during power operation of the fuel rod under close interfacial mechanical contact between the individual chamfered fuel pellets and the ribbed clad tubing, a system of voids or channels of minute dimensions for gas communication remains open and interconnected in the pellet/clad interface all along the fuel column, and the element of this invention thus characteristically comprises:
1. A set of axially extending narrow channels formed between the ribbed bore surface and the pellet column, and
2. pellet-pellet interface volumes composed of (a) a set of circumferential ring-shaped, spacious channels formed between the chamfered pellet end corners and the clad tubing, and (b) any dish volumes at the pellet end surfaces. The channel system thus forms a regular grid structure composed of a multitude of axially oriented channels cross linked by a multitude or ring (torus) shaped channels.

The present invention thus provides for a nuclear fuel element comprising a circular metal cladding tube containing sintered oxide fuel pellets, and the tube is formed internally with a cylindrical inner surface having a plurality of longitudinal ribs forming axially extending channels between the cladding tube and the fuel pellets. The nuclear fuel element of the invention is furthermore characterized by the fact that the fuel pellets have chamfered end faces creating toroidal spaces at the adjoining ends thereof, and the ratio of axial channel volumes to toroidal space volumes including any dish volumes is at most about 1, and preferably not more than about 0.5.

According to one preferred embodiment of the invention the chamfer extends towards the center of the pellet by at least about 10% of the pellet radius.

The number of spacing elements provided on the inner surface of the cladding tube may vary within rather broad ranges. It is preferred to have an even circumferential distribution of the ribs on the inner surface of the cladding tube. Depending upon the technique for manufacturing the ribs, their radial height, their cross-sectional shape etc. different numbers of ribs can be used. A practical range for most purposes considering also distribution of interaction forces and heat transfer is 8 to 64 ribs, whereas a preferred range is 30 to 40.

The invention also includes a process for the manufacture of the cladding tube of nuclear fuel element. This process is characterized by selecting the mandrel dimension in relation to the tube dimension in such a manner that plastic deformation of the tube occurs only at the corners of the polygon form, whereas in the intermediate parts between said corners the deformation is elastic resulting in the desired rib configuration.

To enable full understanding of the invention the following description will contain examples of embodiments of the fuel element claimed, and exemplification will be made in conjunction with the appended drawings, wherein:

FIG. 1 shows a LWR fuel element embodying the invention in axial cross section;

FIG. 2 shows an enlarged detail of the junction between two fuel pellets and the adjoining cladding tube;

FIGS. 3A and 3B show a fragment of the fuel element of the invention in axial cross-section and a cross-section along line A—A of FIG. 3A, respectively.

Figure 4A:
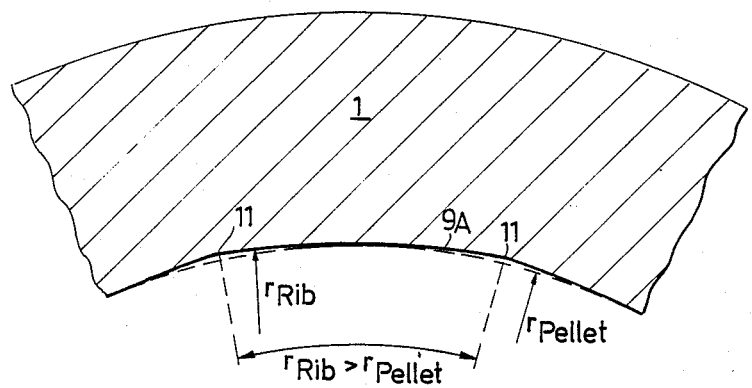
FIGS. 4A, 4B and 4C show enlarged views of sections of three different rib configurations of the cladding tube.

The fuel element as shown in FIG. 1 conforms in all details—except for the ribs on the inside surface of the cladding tube—with a standard type LWR fuel element. The sintered pellets 3 of the encapsuled column are thus centreless ground to very precise diameter dimensions, generally within a tolerance range of ±0.010 mm, the pellet diameter being of the order of 8–12 mm depending on the actual design. The pellet heights can vary from 7–15 mm and the end surfaces of the pellets are often made concave, "dished", to minimize the axial thermal expansion of the pellet column during approach to power. The full pellet column height is quite considerable, usually of the order of about 4 meters. The cladding tube 1 is made of a zirconium alloy, generally Zircaloy, as are also the two end plugs 4 and 8. The end plugs are provided with axially protruding pins 6 and 10, respectively. Said pins 6, 10 have for a purpose to maintain the fuel element in a fixed position in the reactor proper in a conventional manner. The tube 1 fits around the pellet column with a certain cold assembly annular (radial) gap clearance, e.g. within the range of 0.05 mm to 0.15 mm, and is preferably about 0.10 mm. In this disclosure, the dimensions of this annular gap between cladding and pellets, reference is always made to the nominal cold assembly clearance between the circular nominal inner periphery of the cladding tube, disregarding the ribs, and the outer cylinder surface of the fuel pellets. These precise small gap dimensions are required for minimizing the temperature drop across the gap during operation and simultaneously avoiding a more severe mechanical interaction, which represents a potential source of performance problems in the conventional LWR fuel element. During operation the cold assembly gap closes up more or less, depending on actual heat rating and extent of burn up. Often circumferential ridges form on the cladding surface at the positions of the pellet-pellet interfaces, due to mechanical interactions and distortion—"hour-glassing"—of the individual pellets. In the severe case cladding fractures develop at these ridges in conventional prior art fuel elements.

To improve the annular gap heat transfer an inert gas is added to the void volume of the fuel element. This inert gas is normally prepressurized for the purpose of preventing an early creep down of the cladding tube onto the pellet column during operation, and also for minimizing the effect of contamination by fission gases on the gas thermal conductivity.

Again referring to FIG. 1, a plenum space (14) is arranged for accomodating released fission gases and excess inert gas. Also a spring coil 12 acting on the pellet column is located in this plenum space. This spring coil 12 has mainly for its purpose to keep the fuel pellets in place during transportation and handling of the fuel element. Such plenum spaces (14) can also be arranged at both ends of the fuel element. As an inert gas there may be used a noble gas such as helium or argon or a mixture thereof.

FIG. 2 shows a detail of the adjoining area between two fuel pellets 3 and the adjacent section of the cladding tube 1. FIG. 2 shows the chamfer provided at the adjoining corners of fuel pellets 3. The lateral depth of chamfer 5 indicated by distance (a) is at least about 10% of the pellet radius, whereas the axial depth (b) of chamfer 5 preferentially is about a quarter of the lateral depth (a). The chamfering of pellets 3 form together with the surrounding cladding tube 1 a toroidal space 7a.

FIGS. 3A and 3B also show a detail cross section of the fuel element of the invention illustrating also dish cavities 7b, and these figures also indicate the crack pattern of the ceramic fuel arising after a period of operation of the nuclear reactor. The pellet-pellet interface volumes 7a and 7b occupy together a certain fraction of the void volume of the fuel element.

The invention calls for the use of a special shape of the fuel pellets. The fuel pellets should preferably have a length/diameter (L/D) ratio near 1 (one), such as from about 0.8 to about 1.2, in order to avoid the "hour-glass" distortion illustrated in FIG. 7 of the previously mentioned British patent, where the distorted pellets will become locked and actually nearly close the axial channels, as actually intended, by using a quite large L/D ratio. Moreover, according to experimental findings and operational experience the pellet end faces need to be properly chamfered because of the impact of the compressive axial forces on the form and integrity of the pellets under severe PCI conditions. Positioning of the axial loading to the circumferential part of the endface must be avoided, and by chamfering the loading position inwards a distance of at least 10% of the pellet radius as illustrated on FIG. 2 this will be attained. In doing so also a non-permissible "chipping" of the pellet corners into tiny fragments will be avoided and the "hour-glass" distortion of the pellets minimized.

The interfacial gas communication system of the rib cladding comes into useful operation already at low burnup levels, at which state the fuel pellet/clad gap has been occupied to a substantial degree by pellet fragments which have relocated radially outward in "soft mechanical contact" with the cladding ribs. By "soft mechanical contact" is meant that the pellet fragments are spaced apart loosely and do not exert any pressure on the cladding. Under this condition the helium filler gas distributes itself between the voids within the pellet stack and the exterior channel volume in the pellet/clad interface. The helium gas in the voluminous top plenum 14 will now continuously communicate by axial diffusion and convection with the gas contained in the whole fuel section below and thus dilute any released FG. However, the rate of gas migration will be slower in the cracked pellet bodies than in the pellet/clad interface location, because of the more tortuous communication paths in the interior of the pellets. Any FG in the toroidal spaces or torus chambers 7a in the chamfer positions of the pellets will, of course, continuously undergo a faster rate of dilution with helium from the plenum than the FG in the interior voids of the pellet column. In fact each torus chamber will act as a local helium rich plenum to the nearby couple of cracked fuel pellets.

In a conventional type fuel rod, however, where the relocated pellet fragments exhibit an almost perfect geometric fitting to the clad bore the rate of axial gas communication with the top plenum along the narrow pellet/clad interface remains very restricted. In this case the torus chambers and, in particular the voids within the cracked pellets will dilute their FG contents only slowly. This means that the residence time of any released FG will be long and results in a degradation of the rod thermal conduction and a consequent rise in fuel temperature.

The beneficial effect of the aforementioned channel system as regards axial gas communication with the helium in the top plenum is retained at any burnup level where a release of fission gases as a consequence of high power operation or occasional power transients occurs. A restoration of the gas thermal conductivity thus takes place fairly fast and continuously along the whole fuel rod length by the axial gas transport mechanism.

However, at high or extended burnup levels where the accumulated amount of fission gases in the pellet structure has become considerably higher, the consequences of an uncontrolled transient fission gas release may approach or exceed certain life performance limitations in standard type LWR fuel, as for example the permissible internal gas pressure at end-of-life or in case of a LOCA event. Under such conditions the original fuel element design using ribbed cladding needs to be fundamentally modified as described below in order to perform adequately.

The fuel design according to the invention provides for effective control, specifically under mechanically closed pellet/clad conditions, the thermal feed back effect and its consequences in the form of induced high fuel temperature and high internal FG pressure. These effects are known to limit the performance of standard type LWR fuel rods following power ramps that cause the fuel temperature to exceed the critical temperature of significant FGR. According to the invention the integral volumes of the two sets of channel systems involved, i.e., the axial clad bore channels 9 and the pellet torus channels 7a and any dish volumes 7b are balanced in the relative terms so that the former integral volume represents only a fraction of the later integral volume. By this feature of the invention a "burst" (large and sudden) release of fission gases at one section of the fuel rod following a power ramp will cause the internal gas pressure at the position of FGR to increase for a moment. The local gas overpressure will then decline rapidly (within a few seconds) until equilibration because of the fast axial gas flow to the plenum through the narrow but open and straight axial clad bore channels. No thermal feed back effects can be initiated during this short time, but a certain modest temperature rise will follow at the position of FGR, which causes only a local (non-propagating) feed back effect thereat.

In a conventional fuel element design the same amount of released FG are forced to penetrate, under a slow pressure drop for some minutes, the tightly compressed cracked pellet column through long and tortuous flow paths. During that long flow time the fuel temperature will readily rise to cause a propagating thermal feed back and more gas will be released. (When the pressure equilibrates for a longer period of time than that of the fuel rod thermal time constant, i.e., 4-8 seconds, a temperature rise takes place).

Figure 4B:
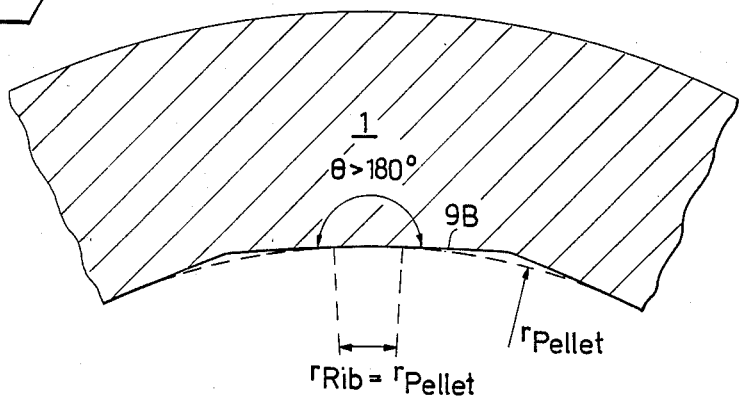
Figure 4C:
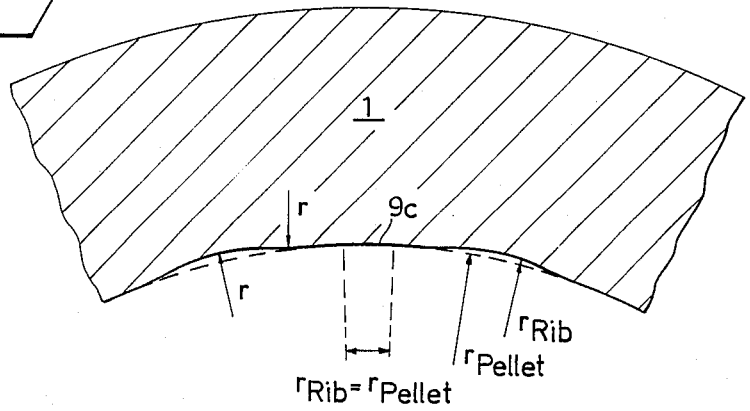

In the fuel element according to the invention the speed of the axial pressure driven gas flow will be magnified by the expanding helium gas contained in the pellet-pellet interface volume due to the raised temperature induced by the power ramp. The flow speed will become greater the smaller the fractional axial channel volume is relative the torus volume including any dish spaces. The fraction of the volume contained in the axial channels around one pellet can according to experience readily be kept to a lower value than 1. The axial channels as illustrated in FIGS. 4A-C and further described below will have still lower fractional values. This means that the ratio of axial to pellet-pellet interface volumes should be lower than about 1 (one) and preferably lower than about 0.5 to be as effective as feasible. In the conventional fuel design the contained helium gas of the torus chambers and any dish spaces have only a limited effect in terms of shortening the flow time until pressure equilibration, because of the inherent very constrained gas flow in that case.

After complete termination of the gas flow period a diffusional mixing of the fission gases with the helium gas follows. In the conventional fuel designs local mixing at each pellet elevation takes place only slowly between the torus plena and the internal and external voids due to the tortuous diffusion paths. In addition, essentially no axial mixing takes place within a reasonable time. Hence the thermal feedback mechanism may easily initiate, or continue to operate, if initiated already during the gas flow period.

In the fuel element design according to the invention essentially no pressure driven penetration of fission gases into the pellet column takes place outside the axial position of FGR. This is due to the fast pressure equilibration. During the flow phase a considerable dilution of the FG with He of the torus plena actually takes place. The diffusional He/FG mixing starts effectively after the short gas flow period. During the diffusional axial mixing, which may take some hours for completion, the thermal conductivity over the pellet/clad interface will be kept fairly high because of the high interfacial contact pressure. The good heat transfer will according to experience keep the temperature rise in the fuel pellets below the critical temperature of FGR or, at least minimize a possible temperature overshoot.

In the irradition experiments underlying this invention it has been noted that the integral thermal conduction of the fuel rods remains fairly unaffected by the power rise and hence the temperature increase kept quite modest, perhaps about 50° C. Also, it has been noted that after about 12 hrs holding at the ramp terminal level the fuel temperature had decreased with about the same magnitude due to the efficient axial diffusional mixing. As mentioned earlier no such discernable mixing takes place within several days in fuel rods of conventional design under mechanically closed gap conditions.

Thus, it is evident that the fuel element design according to the invention performs superior to conventional designs as regards pellet/clad heat transfer, axial gas mixing and thermal feedback effects following transient fission gas release. The prior art design will not at all perform effectively and reliably in these respects.

The potential excessive FGR under load follow/power cycling operation is a very important issue from a fuel performance point-of-view in particular, at high and extended fuel burnup conditions. The risk of entering into a thermal feed back situation with consequent high FG pressure and high fuel temperature is obvious. The fuel element according to the invention will perform excellently under these operating conditions. The ease by which gas flows along the axial channels during the power changes will generate continuous delivery of gas to and removal of gas from the torus chambers so that an effective He/FG mixing is maintained and FG:s are continuously removed from the pellet interior voids. The load follow/power cycling seems actually to be the most beneficial mode of operation when using the fuel element according to the invention. For conventional fuel the opposite seems true.

In this context it should be pointed out that the channel communication system according to the invention with the same advantage can be combined with various PCI failure remedies, like the Zr-liner concept, the graphite interlayer concept, "soft" pellet designs, etc.

Another related objective of the invention is the design means available to adjust and control the fuel thermal response time (or "time constant"). As mentioned earlier smaller diameter rods, e.g., 9×9 instead of 8×8 fuel rod arrays in the assemblies for BWRs suffers of a too short response time in certain types of applications.

The invention offers a unique feasibility to adjust and control the fuel response time for any type of water reactor fuel elements by simply combining a certain cold assembly gap size with a certain filler gas composition of a given pressure. Thus, in order to reduce the thermal conductivity of the filler, the helium can be admixed with a heavier inert gas, such as argon or neon, preferably argon. As for example in the irradiation tests performed the clad rib design was measured to increase the fuel thermal time constant with 0.8 seconds as compared to the conventional design which typically measured 5.0 seconds. In both cases 3 bar pure He and a fabrication annular gap size of 0.075 mm were used. Using a 33% Ar 67% He fill gas mixture under otherwise similar conditions the time constant was measured to be only 0.2 seconds longer, i.e., 6.0 seconds. Should a wider radial gap, say 0.10 mm have been used, the same Ar/He mixture would have produced a still larger time constant.

These results indicate that by increasing the fuel burnup, under which some contamination of the He with FG (Kr/Xe) and some closing of the pellet/cladding gap occurs, the fuel thermal time constant will not change significantly. In conventional fuel designs an increase of the time constant is generally expected, however, starting from a lower value (occasionally too low in 9×9 type rods). At higher burnups, however, a very irregular behaviour is noted.

One important new feature is the redesigned forms and proportions of the two channel systems provided for internal gas communication, as described earlier, resulting in lower local FG concentration in various operating situations. The lower FG concentration achieved will have as an effect to minimize the availability and chemical activity of the aggressive corrodents, like iodine and cadmium, thus depressing the PCI/SCC initiation correspondingly. Also the higher thermal conduction achieved by minimizing the FGR causes the fuel temperature to stay low and hence restricts the rate of FGR and maintains the PCI induced clad stresses low.

Only by using the modification in design as represented by the invention to control the FGR a substantial and reliable improvement in PCI/SCC failure resistance can be obtained.

In the fuel element according to the invention the use of a graphite interlayer between the pellets and the clad bore is additionally very efficient as a PCI/SCC remedy. On applying a 5 micron coating on the fuel pellets no failure at exceedingly large over-power ramping hs been obtained. This behaviour is probably due to an inhibiting chemical effect of the graphite via the gas atmosphere inside the fuel rod. A protective surface layer may have been formed at the clad bore surface inbetween the contacting points where the cladding is being stressed far beyond critical PCI/SCC levels, but remains unaffected by the nearby fuel pellets. In the conventional fuel design using graphite interlayers the PCI/SCC cracks are seen to initiate at clad surface areas, where the pellets have been "scrubbing" the cladding.

Additional new features of significance to the PCI/SCC phenomenon relate to the detailed configuration of the ribbed (or undulated) cladding bore surface. In the conventional art, such as the techniques described in the above-identified British patent, the design is associated with certain disadvantages among which the following may be mentioned.

The flat rib face configuration as of the prior art referred to above may cause splitting of the ceramic pellets at the position of contact under severe mechanical pressure and thus calls for an impractical multitude of such flat ribs around the circumference in order to be avoided. The splitting takes the form of cracks originating at the interaction point. This effect is highly undesirable because it impairs the pellet/cladding heat transfer process and may also produce tiny pellet fragments that enter into the pellet/cladding gap, where they can act as crack initiation points for PCI/SCC. A wider geometrically matching contact area is hence requested.

The heat transfer through the pellet/rib contact sites has proven to be relatively efficient already when using flat ribs. According to the invention significant improvement will be obtained by introducing ribs of an inward concave form. The protruding faces will then enter into contact with the pellet column under both "soft" and "hard" interfacial pressure. Characteristically the ribs will be fewer around the bore than by using flat ribs for the same total pellet/cladding contact area. Hence also the average gap size (and contained channel volume) becomes smaller.

Accordingly, the invention provides for a nuclear fuel element wherein each of the ribs provided on the inside of the cladding tube in a cross-section has an interior contour of which at least a part thereof lies inside a circle segment formed between a circle circumscribing the deepest points of channels 9 and a cord connecting adjacent points, see FIG. 4A, deepest points 11. Thus, at least part of each rib lies radially seen outside a corresponding cord to the said circle through said points.

Said part of the rib as seen in cross-section has preferably a circular shape approximately matching that of the juxtaposed fuel pellet. Said part of the rib suitably has circumferential extension which is about one fifth to one half of the distance between the centre lines of two adjacent ribs.

According to a preferred embodiment of the invention said ribs are evenly distributed over the inside surface of the cladding tube so as to form an inner contour of the cladding tube conforming to a regular polygon. The corners of such polygon may be rounded (FIG. 4C) and the intermediate part deviates from a straight line.

For further illustration examples of embodiments of rib configurations are shown in FIGS. 4A, 4B and 4C. These figures show enlarged fractional sections of cladding tubes 1, the insides of which are provided with longitudinally extending ribs of different shapes.

In the embodiment of FIG. 4A the longitudinally extending rib 9a has a concave circular shape, the radius of curvature, 'Rib, being greater than the pellet radius.

In the embodiment according to FIG. 4B only a fraction of the rib 9b has a concave circular shape, the radius of curvature ('Rib) of which is equal to the pellet radius, 'Pellet. This circular part of rib 9b is about one third of the distance between the centres of adjacent ribs.

In the embodiment of FIG. 4C rib 9c also has a central part of a concave cylindrical shape, but in this embodiment the corners corresponding to the polygon formed inside the cladding tube 1 by the ribs are rounded instead of fairly sharp.

The optional configurations of FIGS. 4A, B and C are specific to the fabrication process being applied. The ribs according to FIGS. 4A and B can be produced by a conventional tube reducing technique and those of FIG. 4C e.g. a plug drawing method. The rib contour of FIG. 4C produces a more favorable channel form with respect to axial gas flow under closed gap conditions as it gives less gas flow resistance. The flow resistance is roughly inversly proportional to the third power of the gap width.

I claim:

1. A nuclear fuel element for use in power-producing nuclear reactors, comprising a circular metal cladding tube containing sintered cylindrical oxide fuel pellets and an inert filler gas, the tube being formed internally with a substantially cylindrical inner surface having a plurality of longitudinal ribs forming axially extending channels and axial channel space volumes, the fuel pellets having chamfered endfaces creating toroidal space volumes at the adjoining ends of the fuel pellets, the ratio of the axial channel space volumes to toroidal space volumes including any dish volumes at the pellet end faces being substantially equal to or less than one (1).

2. The nuclear fuel element according to claim 1, wherein the chamfer extends towards the centre of the pellet by at least about 10% of the pellet radius.

3. The nuclear fuel element according to claim 1, wherein the fuel pellets have a length/diameter ratio of from about 0.8 to about 1.2.

4. The nuclear fuel element according to claim 2, wherein a heavier inert gas is added to the helium filler gas of the fuel element and wherein a plenum space is arranged at at least one end of the element for accommodating released fission gases.

5. The nuclear fuel element according to claim 1, wherein each of said ribs, in cross-section has an inward contour at least part of which lies inside a circle segment formed between a circle circumscribing the deepest points of channels and a chord connecting adjacent deepest points.

6. The nuclear fuel element according to claim 5, wherein said part has a circular shape approximately matching that of the juxtaposed fuel pellet.

7. The nuclear fuel element according to claim 6, wherein said circular part occupies about one fifth to one half of the rib centre spacing.

8. The nuclear fuel element according to claim 1, wherein said ribs are evenly distributed over the inside surface of the cladding tube so as to form an inner contour of the cladding tube conforming to a regular polygon.

9. The nuclear fuel element according to claim 1, wherein a thin layer of graphite is present between the pellet column and the cladding.

10. The nuclear fuel element according to claim 1, wherein the said ratio of axial channel to toroidal space volumes is at most about 0.5.

11. A process for the manufacture of a nuclear fuel element according to claim 5 comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

12. The nuclear fuel element according to claim 2, wherein the fuel pellets have a length/diameter ratio of from about 0.8 to about 1.2, such as approximately one (1).

13. The nuclear fuel element according to claim 3, wherein the said ratio of axial channel to toroidal space volumes is at most about 0.5.

14. A process for the manufacture of a nuclear fuel element according to claim 6, comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

15. A process for the manufacture of a nuclear fuel element according to claim 7, comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

16. A process for the manufacture of a nuclear fuel element according to claim 8, comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

17. A process for the manufacture of a nuclear fuel element according to claim 9, comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

18. A process for the manufacture of a nuclear fuel element according to claim 10, comprising the steps of forming a cylindrical cladding tube by tube drawing using a polygonal mandrel, characterized by selecting the mandrel dimension in relation to the tube dimension in such a manner that plastic deformation of the tube occurs only at the corners of the polygonal form, whereas in the intermediate parts between said corners the deformation is elastic resulting in the desired rib configuration.

19. The nuclear fuel element according to claim 1, wherein the inert filler gas is helium.

* * * * *